Sept. 9, 1969        J. R. FORSTER        3,465,801

COMBINED FEED MILL AND FEED AUGER

Filed Feb. 13, 1967        2 Sheets—Sheet 1

Sept. 9, 1969  J. R. FORSTER  3,465,801
COMBINED FEED MILL AND FEED AUGER

Filed Feb. 13, 1967  2 Sheets-Sheet 2

United States Patent Office 3,465,801
Patented Sept. 9, 1969

3,465,801
COMBINED FEED MILL AND FEED AUGER
John R. Forster, Killam, Alberta, Canada
Filed Feb. 13, 1967, Ser. No. 619,508
Int. Cl. B02c 9/04, 23/02; B02b 5/02
U.S. Cl. 146—107          2 Claims

ABSTRACT OF THE DISCLOSURE

A combined feed mill and feed auger wherein the auger is supported on an inclined track mounted transversely on the feed mill. The auger may be operated on the track from a raised carrying position to a lowered feed pickup position. In the lowered feed pickup position, the auger will pick up feed at one side of the mill and deliver such feed to the mill. Means is provided to operate the auger throughout a portion of its travel between the lowered feed pickup position and the raised carrying position.

BACKGROUND OF THE INVENTION

Field of the invention

This invention pertains to a combined feed mill and powered screw feeder auger. The auger is carried by the feed mill and is powered from the feed mill power source.

Description of the prior art

Feed mills commonly include a storage tank mounted on a wheeled framework that may be drawn behind a tractor. Feed intake and feed chopping mechanisms form part of the mill as well as blowers which blow the chopped feed into the mill storage tank. It is the usual practice to drive the feed chopping mechanisms and the blowers from the power-take-off of the tractor drawing the feed mill.

For most efficient operation, a feed mill is used with a feed auger that will pick up and discharge feed into the mill. In the past the auger has been mounted on a separate, wheeled framework with its own power source. When the feed mill was moved into position to grind feed it was necessary to move the auger into position to pick up feed and discharge it into the mill.

Since there was a power source on both the feed mill and auger, it was necessary to operate both power sources to run both pieces of equipment at the same time.

Aside from the problem of the duplication of machinery, there was the problem of the disposal of feed left in the auger when the auger was moved away from the feed source. If the auger was of any length, a considerable quantity of feed remained therein. Unless some receptacle was used to catch this feed as it was driven from the auger, there was a danger of the feed being discharged on the ground and lost.

SUMMARY OF THE INVENTION

The present invention provides a combined feed mill and feed auger wherein the feed auger is carried transversely of the mill on an inclined support. The feed auger may be moved to a feed pick up position at the side of the mill to pick up and discharge feed into the mill. As the auger is moved from the feed pick up position to its carrying position, feed left in the auger is discharged into the feed mill.

DESCRIPTION OF THE PREFERRED EMBODIMENT

Figure 1:
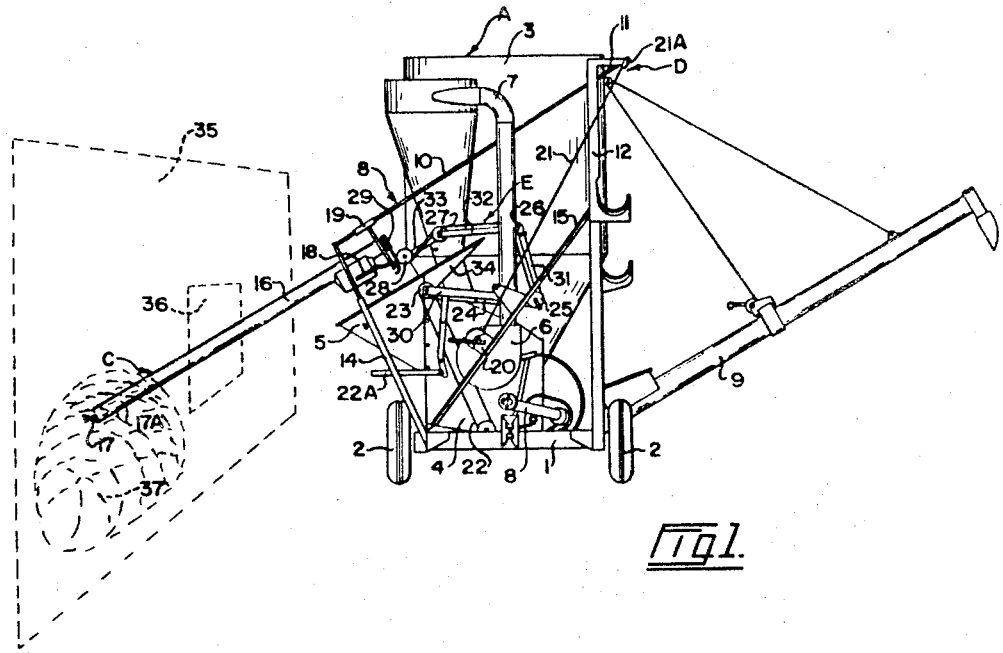
FIGURE 1 is a front view of a combined feed mill and auger in accordance with my invention with the feed auger in the lowered feed pick up position.

As seen in the preferred embodiment illustrated in the drawings, my invention includes broadly a movable feed mill indicated generally at A; auger support means in the form of an inclined track, indicated generally at B; mounted on the feed mill transversely thereof; feed auger means, indicated generally at C, adapted to be supported on and move longitudinally on the inclined track B; means indicated generally at D, for moving the feed auger means C from a feed pick up position, wherein the lower end of the auger extends out at the side of the feed mill and the auger discharge is disposed over the feed intake of the feed mill to a raised carrying position; and flexible drive means, indicated generally at E, for operating the feed auger.

The moveable feed mill A, includes the framework 1 which is mounted on the wheels 2—2 for transportation. A feed storage bin 3 is mounted on the framework 1 along with the feed intake 5 and feed grinding mechanism 4. The blower 6 and elevating pipe 7 discharge feed to the storage bin 3. The blower 6 is driven from the drive shaft 8 adapted for connection to power means such as a tractor power-take-off. A discharge pipe 9 of conventional form is also carried on the framework, such pipe 9 is shown in the discharge position in FIGURES 1 and 2 and in the transport position in FIGURE 3.

The auger support means B includes an inclined track in the form of a squared rod 10 supported at its upper end 11 at the top of the vertical support 12. At its lower end 13 the rod 10 is supported on the bracket 14 extending up from framework 1.

The feed auger means C includes a cylindrical housing 16 having a rotatable auger 17 whose feed pick up is at its lower end 17A and feed discharge is at its upper end 18. The auger means C is slidably supported on the squared rod 10 by means of the squared collar 19. The collar 19 is slideably fitted on the rod 10 and is connected to the auger means 16 near the end 18.

The means B for moving the feed auger C along the rod 10 includes a hand operated hoisting winch 20 and hoisting cable 21. The hoisting cable 21 extends over the pulleys 21A at the upper end 11 of the rod 10. From the pulleys 21A the cable extends alongside the rod 10 and is connected securely to the collar 19. In the preferred embodiment illustrated the winch 20 is of the type now commonly used for hoisting boats onto boat trailers or for other small hand winching operations. Winches of this type normally include a form of ratchet to lock the winch. In the preferred embodiment the winch 20 would be locked against any unwanted movement when the feed auger C has been hoisted to the carrying position.

The means E for operating the feed auger includes the drive pulley 22B connected to receive power from the feed grinder 4 of the feed mill, the driven pulley 29 connected to the auger 17 and means in the form of drive belts 22 and 24 which serve to transfer power from the drive pulley 22B to the driven pulley 29.

The drive belt 22 couples the pulley 22B to one pulley of the pair of pulleys 23 rotatably mounted at one end of the arm 30. The arm 30 is connected pivotally at 30A in the framework, and is connected to the tightening arm 22A which may be manipulated to move the arm 30 up and down about its pivot 30A and tighten the belt 22.

Arms 31, 32 and 33 are connected together in articulated fashion, and interconnect the opposite end of the arm 30 to the discharge end 18 of the feed auger means 16. Pairs of pulleys 25, 26, 27 and 28 are each rotatably mounted at one of the articulated joints of the arms 30, 31, 32 and 33. The drive belt 24 connects the second pulley of the pair of pulleys 23 to the driven pulley 29 and is routed over the pairs of pulleys 25, 26, 27 and 28.

The use of articulated arms and pulleys to transfer power through a belt routed over a number of pulleys is found commonly in the drive for dentists drills and like instruments where the drive belts must operate through a variety of angles. In this case, the principal function is to provide power to the auger means C when it is in its lowered pick up position and to maintain the auger in operation during a portion of its movement along the lower portion of the rod 10.

Figure 2:
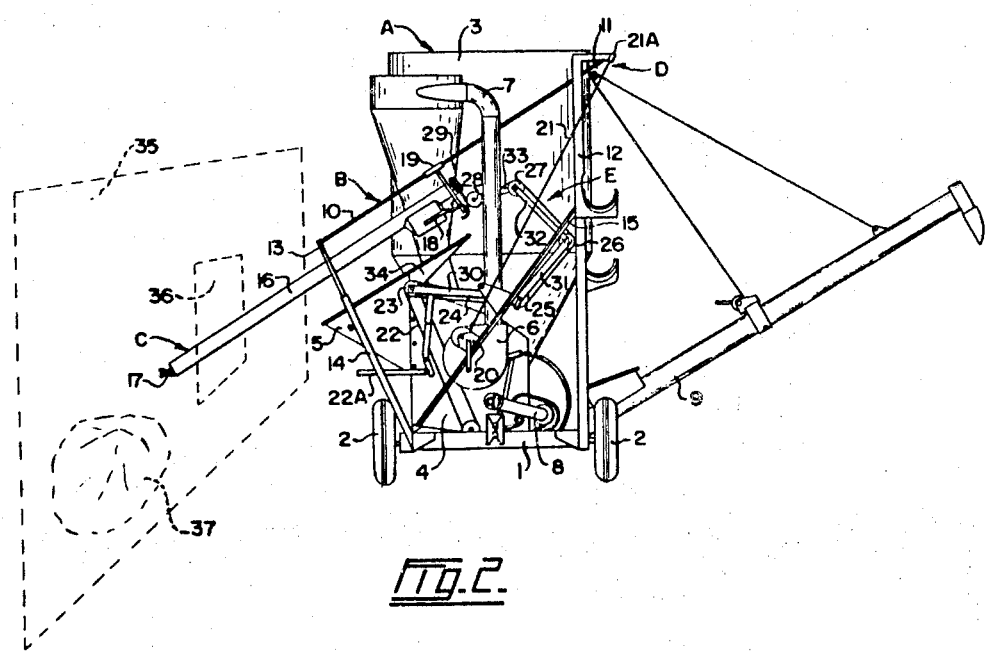
FIGURE 2 is a view similar to FIGURE 1 showing the feed auger in a partially raised position.
Figure 3:
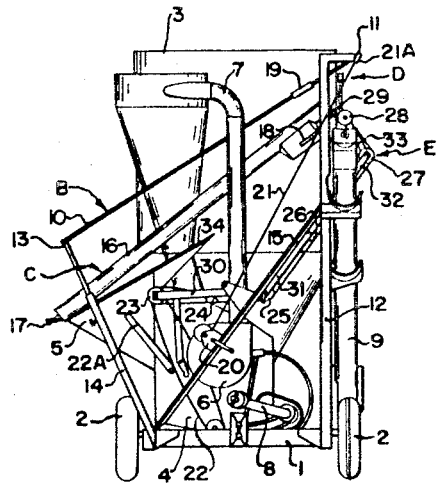
FIGURE 3 is another view similar to FIGURES 1 and 2 showing the feed auger in the raised carrying position.
Figure 4:
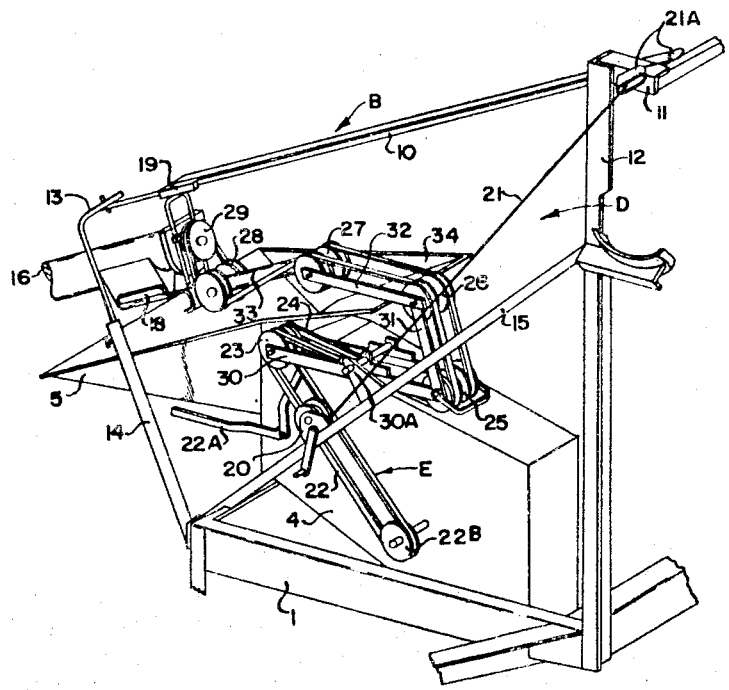
FIGURE 4 is an enlarged detailed perspective view of the auger drive mechanism.

The length of the drive belt 24 is such that, when the auger means is in the fully raised position as seen in FIGURE 3, the drive belt 24 will be loose on the drive pulley 22B and drive pulley 29, and the auger means C will not be in operation. As the auger means C is moved down the rod 10 to the extended position illustrated in FIGURES 1 and 2, the drive belt 24 will automatically tighten on the pulleys 22B and 29 to start the auger in operation.

In the preferred embodiment illustrated, the drive belt 24 will tighten on the pulleys 22B and 29 when the auger means C reaches approximately the position illustrated in FIGURE 2.

When the auger means C is drawn up the rod 10 to the raised carrying position, the drive belt 24 will not loosen on the pulleys 22B and 29 until the auger means C has gone past approximately the position illustrated in FIGURE 2. The auger will therefore remain in operation to discharge any feed remaining in the auger into the feed intake 5.

The feed intake 5 of the mill is extended at 34 to receive feed discharged from the auger as the auger is drawn up the rod 10.

In operation and with the mechanism assembled as illustrated and described, the feed mill is hauled into position alongside a grainery or storage shed 35. The feed mill is stopped adjacent the opening 36 in the side of the shed 35 and the winch 20 is actuated to release the feed auger means C and allow it to slide down the rod 10 with the feed pick up end 17A entering the opening 36.

As described previously, the drive belt 24 will tighten on the pulleys 22B and 29 when the auger means C reaches approximately the position illustrated in FIGURE 2. This will start the auger 17, and when the pick up end 17A contacts a pile of feed, as indicated at 37, rotation of the auger 17 will draw the auger means C down into the feed unit until it reaches the fully extended position illustrated in FIGURE 1.

Feed picked up by the auger means C then will be discharged through the feed discharge 18 into the intake 5 until the desired quantity of feed from the pile 37 has been transferred to the feed mill.

To raise the auger means C to the carrying position, the winch 20 is actuated to draw the auger means C up the rod 10. During movement of the auger means C out of the feed 37 and up the rod 10, the auger will remain in operation until it reaches the position approximately indicated at FIGURE 2 and will discharge any feed left in the auger through the discharge 18 to the extension 34 of the intake 5. When the auger means C has moved past the position illustrated in FIGURE 2, the drive belt 24 will be loose and will no longer drive the auger. The auger means C then is drawn up the rod 10 to the raised carrying position as illustrated in FIGURE 3 in the drawings.

What I claim as my invention is:

1. A combined feed mill and auger comprising, in combination:
   a movable feed mill having a feed intake and power means to operate the mill;
   an upwardly inclined track mounted transversely on the feed mill;
   feed auger means, having a feed pick up end and a feed discharge end, mounted on the track for longitudinal movement thereon from a feed pick up position, wherein the feed pick up end extends out at the side of the feed mill and the feed discharge end is disposed over the feed intake of the feed mill, to a transport position;
   means adapted to move the auger along the track from one position to the other; and
   flexible drive means, connected to the feed mill drive means, adapted to drive the feed auger as it moves along the track.

2. A combined feed mill and auger comprising, in combination:
   a movable feed mill having a feed intake and power means to operate the mill;
   an inclined track supported on the feed mill;
   a feed auger having a feed pick up end and a feed discharge end;
   means supporting the feed auger on the inclined track for sliding movement thereon from a lowered feed pick up position to a raised carrying position;
   a hoisting winch mounted on the mill and adapted to move the feed auger from the lowered feed pick up position to the raised carrying position;
   means to operate the feed auger including, a drive pulley connected to the power means, a driven pulley connected to the auger, a plurality of interconnected articulated arms extending from the drive pulley to the driven pulley, guide pulleys at each articulated joint in the articulated arms, a drive belt travelling on the guide pulleys and coupling the drive pulley to the driven pulley, the length of the drive belt being such that when the feed auger is in the raised carrying position the drive belt will be coupled loosely to the drive pulley and the driven pulley and the feed auger will not be driven and when the feed auger is lowered substantially halfway on the inclined track towards the feed pick up position the drive belt will tighten on the drive pulley and driven pulley to drive the feed auger.

References Cited

UNITED STATES PATENTS

| 2,401,465 | 6/1946 | Cwicig | 214—83.26 |
| 2,815,941 | 12/1957 | Schmale | 241—101 X |
| 3,395,868 | 8/1968 | Dodgen et al. | 146—71 X |

W. GRAYDON ABERCROMBIE, Primary Examiner

U.S. Cl. X.R.

214—83.26; 241—101, 186